United States Patent Office 3,096,185

Patented July 2, 1963

3,096,185

HIGH DIELECTRIC MATERIAL

Daniel P. Lucero, 438 W. 94th St., Los Angeles 37, Calif.

No Drawing. Filed Feb. 3, 1960, Ser. No. 6,366
1 Claim. (Cl. 106—39)

This invention relates to high dielectric materials particularly ceramic materials having in addition to a high dielectric constant other electrical and physical properties making the materials highly adapted for a large number of present day needs in industry for such materials.

The invention primarily lies in the conception, discovery, synthesis, and preparation of a high dielectric material as in the foregoing also possessing certain other sought after electrical and physical properties in a desired and/or required degree. The invention lies of course in the field of solid state physics, being concerned primarily with the electrical and magnetic aspects of the solid state. The invention of the novel and improved materials described herein stems from the conception and ultimate discovery that materials possessing a certain desirable combination of electrical and physical properties could in fact be synthesized, developed and produced. The desired properties are obtained and realized in the solid state when a molecule is synthesized and composed of selected atoms of specific radii that are in a particular atomic arrangement with respect to their interatomic positions and distances relative to each other in a specific crystal structure. A molecule possessing the atoms and atomic structure of a dielectric material is synthesized by suitably preparing a mixture of the constituent atoms so that when it is subjected to a prescribed environment, a chemical reaction occurs. The production of the reaction is a molecule possessing the desired electric properties.

The invention herein lies in the discovery and synthesis of the particular high dielectric material and the objective of the invention is to make the material available so as to fill the many industrial needs for such material.

A further objective of the invention is to provide a high dielectric material having electrical properties in certain degrees as relate to dielectric constant, dielectric strength, dissipation power factor, resistivity, etc.

A further more specific objective of the invention is to provide a ceramic composition having the above stated desired properties, which composition is one formulated of certain metallic oxides, and barium titanate and cobaltous carbonate being present in certain percentage ranges as will be pointed out in detail hereinafter as well as the precise method of formulating the composition.

Those skilled in the art will understand that a high dielectric material having other electrical properties as enumerated in the foregoing in the proper degree and also having appropriate physical properties constitutes a material for which there is a ready market and need in industry. Such material is highly adaptable and useful for capacitors and noise filters in many types of circuitry including communications and television circuitry and also many other types of electrical circuitry. Such materials have wide usage as well in many forms and types of electrical components.

In general the novel compositions of the present invention comprise fired mixtures of the various metal oxides with cobaltous carbonate and barium titanate in particular percentage ranges.

In the practice of the invention the ingredients as indicated in the table below and in the percentages given subject to the variations stated were weighed out on an analytical balance to the nearest 0.1 milligram. The particle size of the ingredients should be within the range of five to ten microns. A charge of 100 grams in a solution of isopropyl alcohol and stearic acid was placed in a six-inch ball mill and mixed for six hours.

After thoroughly mixing the constituents, discs ⅝ in. in diameter and $\frac{1}{16}$ inch thick were dry-pressed in floating dies under sustained pressures ranging from 25,000 to 55,000 p.s.i. for a period of five minutes.

The freshly pressed discs were loaded into the furnace at 70° F. and brought to 2200° F. in nine hours, and maintained there for 30 hours. The furnace was cooled to room temperature, 70° F. in 24 hours and the material removed.

In firing, the furnace is first brought to approximately 300° F. at which time the stearic acid begins to come off. It is, then, elevated in temperature to approximately 740° F., so that the stearic acid may come off at a relatively low temperature and be completely removed and for this purpose the temperature is held at approximately 740° F. for about 3 hours. Unless the stearic acid is thus slowly removed, voids may be formed by rapid vaporization of the stearic acid within the body of the material. It is desired to have a greater density rather than a lesser density of the material and the voids would of course give it lesser density.

With respect to the titanium dioxide content, the reaction time in firing becomes greater as the percentage of titanium dioxide drops. The titanium dioxide appears to catalyze the reaction and eliminates undesired side reactions during the firing process.

With respect to the percentage of stearic acid, this material is added as a lubricant and while stearic acid is found to be best suited to the purpose, lauric acid and ethyl cellulose or other organic lubricants may also be used, for the purpose of coating the individual grains of the material and thereby permitting them to be packed into a more closely compacted mass and also serves as a parting agent in the die. In other words, it assists compacting of the material and also serves as a die-parting agent.

It is not desired that the original chemical constituents include any free metals, such as iron, cobalt or other transitional elements to avoid an undesired drop in resistivity. It is not desired to have any alkaline earth metals, such as sodium, potassium or the like, present in free form, inasmuch as they would induce an undesired vitrification in the firing process and also contribute to a drop in resistivity like the other free metals, such as iron, cobalt, or the like, above mentioned.

While isopropyl alcohol is preferred solution, other alcohols may be also employed. Ketones and acetones, however, are undesirable because of their double bonds which enter into and interfere with the chemical change desired during the firing. The mixing for six hours mentioned above is intended to obtain the proper particle size and to coat the particles with the stearic acid or other organic lubricant previously mentioned. Thereafter, the isopropyl alcohol with which the stearic acid has theretofore been mixed, is slowly evaporated off at approximately 150° F. for about 3 hours. Unless this slow method of evaporation is accomplished, an undesired film of stearic acid is formed on the top of the material and interferes with the subsequent firing process.

With respect to the pressing and forming step, it is desired to apply as much pressure as possible. About 55,000 pounds per square inch is optimum under normal conditions, but more pressure can be applied provided it is not enough to generate heat which might melt the stearic acid. Therefore, if the material is refrigerated or the heat of compression otherwise removed, the pressure may exceed and preferably can exceed 55,000 p.s.i., inasmuch as the greater pressure gives a more compact and denser resultant product which is therefore desirable as having optimum desired physical and electrical characteristics. With lesser pressures, the chemical reaction during the firing period is slowed and, therefore, would require greater heating time.

Before firing, the material is dark reddish-brown, and powdery before pressing. Its average particle size in a preferred example is approximately 7 microns.

The end product after firing has the following physical characteristics: It is black, dull before polishing; its hardness on a scale of 1 to 10 is approximately 8, so that it is fairly hard material. It is non-brittle and has a high compressive strength. Its texture appears to the naked eye to be uniform and generally of the appearance of an aspirin tablet after compression and firing.

Its structure is actually crystalline and it is identifiable as to its particular type of crystalline structure.

It also has slight magnetic properties as evidenced by bringing a magnet into proximity thereto. The extent to which it is magnetic has not been quantitatively measured as yet.

The following table indicates the formulation of the compositions and the electrical properties thereof:

| | Percent by weight |
|---|---|
| Ferrous oxide (FeO) | 3 to 8.97 |
| Cobaltous carbonate ($CoCO_3$) | 6.6 to 7.42 |
| Ferric oxide ($Fe_2O_3$) | 25 to 39.86 |
| Nickelous oxide (NiO) | 4 to 4.66 |
| Barium titanate ($BaTiO_3$) | 24 to 29.12 |
| Titanium dioxide ($TiO_2$) | 9 to 9.97 |

To the total constituents above was added 1.4% stearic acid.

After the firing at 2200° F., the cobaltous carbonate is decomposed to carbon dioxide which escapes from the composition and cobaltous oxide. Consequently, in the case of the composition illustrated by the upper limits of the table above, the resulting composition has the following formulation by weight, ferrous oxide, 9.22%; cobaltous oxide, 4.80%; ferric oxide, 40.99%; nickelous oxide, 4.79%; barium titanate, 29.94%; and titanium dioxide, 10.25%. It should be noted that the foregoing percentages add up to 99.99%, since they have been rounded off to their second decimal place after converting the aforementioned composition above to the basis of a composition having cobaltous oxide. In summary therefore, the fired composition would have a formulation in percent by weight of about 41% ferric oxide, 30% barium titanate, 10% titanium dioxide, 9% ferrous oxide, 5% cobalt oxide, and 5% nickel oxide.

Tests of the discs formulated in accordance with the foregoing composition and by the method as outlined showed the material to possess these properties:

| | |
|---|---|
| Dielectric constant | 20,000 to 30,000. |
| Dielectric strength ... volts/mil | 100 to 150. |
| DQ (dissipation power factor as measured on a bridge type meter) | 2 to 5. |
| Resistivity ... ohm/cm | $10^{10}$ to $10^{15}$. |

The chemical constituents or ingredients were rated as chemically pure with negligible impurities. The ingredients thus contained practically or virtually no free metals or free alkalies such as sodium, potassium and the like.

The range of materials used are as noted above; the ferrous oxide can range from about 3% to about 8.97%, the 8.97% being optimum. The cobaltous carbonate can range from 6.6 to 7.42; the ferric oxide from 25% to 39.86%; and the nickelous oxide from 4 to 4.66%. It is to be noted in connection with the above percentages that the percentage of the ferrous oxide, cobaltous carbonate, ferric oxide and nickelous oxide varies directly with the dielectric constant of the material and the percentage composition of those respective ingredients varies inversely with the resistivity of the material. The resistivity and dielectrical constant of the material differs rather sharply as the percentage of the nickelous oxide, barium titanate and titanium dioxide, respectively, are varied, that is to say, sharply with respect to the dielectric constant, varying directly with the dielectric constant, and also inversely as the resistivity, as previously pointed out.

From the foregoing it will be seen that the present invention provides compositions eminently suitable as dielectric materials for a wide variety of uses. The examples as set forth are illustrative of the invention, which is to be accorded the full scope of the appended claim.

What is claimed is:

A fired composition having a dielectric constant in the range of about 20,000 to 30,000, consisting of, by weight, about 41% ferric oxide, 30% barium titanate, 10% titanium dioxide, 9% ferrous oxide, 5% cobalt oxide and 5% nickel oxide.

References Cited in the file of this patent

UNITED STATES PATENTS

| | | |
|---|---|---|
| 2,520,376 | Roup et al. | Aug. 29, 1950 |
| 2,528,113 | Carlson et al. | Oct. 31, 1950 |
| 2,529,719 | Wentworth | Nov. 14, 1950 |
| 2,935,411 | Robinson | May 3, 1960 |
| 2,968,622 | Whitehurst | Jan. 17, 1961 |
| 2,980,546 | Plessner et al. | Apr. 18, 1961 |

FOREIGN PATENTS

| | | |
|---|---|---|
| 151,031 | Australia | Apr. 23, 1953 |
| 211,542 | Australia | Nov. 25, 1957 |
| 215,353 | Australia | June 3, 1958 |

OTHER REFERENCES

I.B.M. Technical Disclosure Bulletin, vol. 2, No. 3, of October 1959 (page 43).